US009696606B2

(12) United States Patent
Lee et al.

(10) Patent No.: US 9,696,606 B2
(45) Date of Patent: Jul. 4, 2017

(54) DISPLAY DEVICE (71) Applicant: Samsung Display Co., Ltd., Yongin (KR)

(72) Inventors: Baek Hee Lee, Yongin-si (KR); Jong Hyuk Kang, Suwon-si (KR); Jae Byung Park, Seoul (KR); Hyun Min Cho, Hwaseong-si (KR); Sung-Jin Hong, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 126 days.

(21) Appl. No.: 14/304,233

(22) Filed: Jun. 13, 2014

(65) Prior Publication Data
US 2015/0009440 A1 Jan. 8, 2015

(30) Foreign Application Priority Data

Jul. 2, 2013 (KR) .......................... 10-2013-0077441

(51) Int. Cl.
*G02F 1/1335* (2006.01)
*G02F 2/02* (2006.01)

(52) U.S. Cl.
CPC ............ *G02F 2/02* (2013.01); *G02F 2202/36* (2013.01)

(58) Field of Classification Search
CPC ......... G02F 1/133528; G02F 1/133536; G02F 2/02; G02F 2202/36; G02B 6/0229
(Continued)

(56) References Cited

U.S. PATENT DOCUMENTS 7,649,594 B2   1/2010 Kim et al.
8,242,679 B2 * 8/2012 Noh ....................... B82Y 20/00
                                                    313/483
(Continued)

FOREIGN PATENT DOCUMENTS

KR   10-2012-0007780   1/2012
KR   10-2012-0066322   6/2012
WO      2010-095140   8/2010

OTHER PUBLICATIONS

Hsiao-Sheng Chen, et. al., "Color-Tunable Light-Emitting Device Based on the Mixture of CdSe Nanorods and Dots Embedded in Liquid-Crystal Cells," J. Phys. Chem. C, vol. 114, No. 17, American Chemical Society, pp. 7995-7998, Apr. 1, 2010.

(Continued)

*Primary Examiner* — Nathanael R Briggs
*Assistant Examiner* — William Peterson
(74) *Attorney, Agent, or Firm* — H.C. Park & Associates, PLC (57) ABSTRACT

A display device includes a light source generating light and a thin film transistor array panel including a pixel electrode and a common electrode. The display includes an upper panel and a quantum rod layer positioned between the thin film transistor array panel and the upper panel. The display includes an upper polarizer attached outside of the upper panel, in which the quantum rod layer includes quantum rods, and an arrangement direction of the quantum rods is controlled by an electric field generated by the pixel electrode and the common electrode, light is polarized according to the controlled arrangement direction, and the polarizer controls the transmission degree of the polarized light from the quantum rods according to the arrangement direction of the quantum rods.

15 Claims, 9 Drawing Sheets

(58) Field of Classification Search
USPC .......................................................... 349/96
See application file for complete search history.

(56) References Cited

U.S. PATENT DOCUMENTS

| | | | |
|---|---|---|---|
| 8,294,849 B2 | 10/2012 | Toko | |
| 2010/0208172 A1 | 8/2010 | Jang et al. | |
| 2011/0220869 A1 | 9/2011 | Cho et al. | |
| 2011/0299001 A1* | 12/2011 | Banin | B82Y 20/00 |
| | | | 349/33 |
| 2013/0002998 A1* | 1/2013 | Sawaki | G02B 5/3058 |
| | | | 349/97 |
| 2013/0077038 A1* | 3/2013 | Rho | B82Y 20/00 |
| | | | 349/144 |

OTHER PUBLICATIONS

Kuan-Ju Wu, et. al., "CdS Nanorods Imbedded in Liquid Crystal Cells for Smart Optoelectronic Devices," Nano Letters, vol. 7, No. 7, American Chemical Society, pp. 1908-1913, Jun. 7, 2007.
Qingkun Liu, et al., "Switchable Polarization-Sensitive Surface Plasmon Resonance of Highly Stable Gold Nanorods-Liquid Crystals Composites," SPIE-OSA-IEEE, vol. 8308, pp. 830810-1-6, 2011.
Yan Jun Liu, et. al., "Light-Driven Plasmonic Color Filters by Overlaying Photoresponsive Liquid Crystals on Gold Annular Aperture Arrays," Advanced Optical Materials, pp. OP131-OP135, Mar. 21, 2012.
Tsung-Ju Lin, et al., "Liquid crystal cells with built-in CdSe nanotubes for chromogenic smart emission devices," Optics Express, vol. 16, No. 2, pp. 671-678, Jan. 21, 2008.

* cited by examiner

DISPLAY DEVICE

CROSS-REFERENCE TO RELATED APPLICATION

This application claims priority to and the benefit of Korean Patent Application No. 10-2013-0077441, filed on Jul. 2, 2013, which is hereby incorporated by reference for all purposes as if fully set forth herein.

BACKGROUND

Field

Exemplary embodiments of the present invention relate to a display device.

Description of the Background

Display devices have been developed from a cathode ray tube (CRT) using an existing cathode ray tube to various flat panel display devices such as a liquid crystal display (LCD), a plasma display panel (PDP), an organic light emitting display (OLED), an electrowetting display (EWD), an electrophoretic display (EPD), an embedded micro cavity display (EMD), and a nano crystal display (NCD).

Since the liquid crystal display (LCD) among the flat panel displays has advantages such as a small size, a light weight, and low power consumption, it has gradually received attention as a replacement means for overcoming disadvantages of an existing cathode ray tube (CRT). Currently, the liquid crystal display has been adopted by almost all information processing devices demanding such advantages of the display device. The liquid crystal display is a device in which a liquid crystal material is injected between an upper substrate where a common electrode, and a color filter may be formed and a lower substrate where a thin film transistor and a pixel electrode may be formed to apply different potentials to the pixel electrode and the common electrode, and then an electric field is applied to change alignment of liquid crystal molecules, thereby controlling transmittance of light to express an image.

Further, in general, a display device may include a lower polarizer, an upper polarizer, and a color filter. In this general configuration, there is a light loss problem in a way of light emitted from a backlight unit passes through the lower polarizer or the color filter and thus light loss occurs.

The above information disclosed in this Background section is only to set up Applicant's recognition of problems within existing art and merely for enhancement of understanding of the background of the invention based on the identified source of problems, and therefore the above information cannot be used as prior art in determining obviousness into the present invention.

SUMMARY

Exemplary embodiments of the present invention provide a display device in which a lower polarizer is not included by using a quantum rod layer. Further, exemplary embodiments of the present invention provide a display device in which a color filter is not additionally included.

Additional features of the invention will be set forth in the description which follows, and in part will be apparent from the description, or may be learned by practice of the invention.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

Exemplary embodiments of the present invention disclose a display device. The display device includes a light source. The device includes a thin film transistor array panel including a pixel electrode and a common electrode. The device includes an upper panel. The device includes a quantum rod layer positioned between the thin film transistor array panel and the upper panel. The device includes a polarizer attached outside of the upper panel. The quantum rod layer includes quantum rods, and an arrangement direction of the quantum rods is controlled by an electric field generated by the pixel electrode and the common electrode, wherein light is polarized according to the controlled arrangement direction. The polarizer is configured to control the transmission degree of the polarized light from the quantum rods according to the arrangement direction of the quantum rods.

Exemplary embodiments of the present invention disclose a method including disposing a quantum rod layer between panels of a display device, the quantum rod layer comprising quantum rods. The method includes generating an electric field to control an arrangement direction of the quantum rods, wherein light is polarized according to the controlled arrangement direction. The method also includes disposing a polarizer to control the transmission degree of the polarized light from the quantum rods according to the arrangement direction of the quantum.

Exemplary embodiments of the present invention disclose a display. The display includes a controller. The display includes a thin film transistor array panel comprising a pixel electrode and a common electrode. The display includes a quantum rod layer comprising quantum rods, wherein the controller is configured to control of arrangement direction of the quantum rods by generating an electric field by the pixel electrode and the common electrode. The display also includes a polarizer that is configured to control the transmission degree of polarized light from the quantum rods according to the arrangement direction of the quantum. rods It is to be understood that both the foregoing general description and the following detailed description are exemplary and explanatory and are intended to provide further explanation of the invention as claimed.

DETAILED DESCRIPTION OF THE ILLUSTRATED EMBODIMENTS

A display device and a method for manufacturing a display device using a quantum rod layer are disclosed. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, and regions may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A display device according to exemplary embodiments of the present invention will be described in detail with reference in FIGS. 1 to 8.

Figure 1:
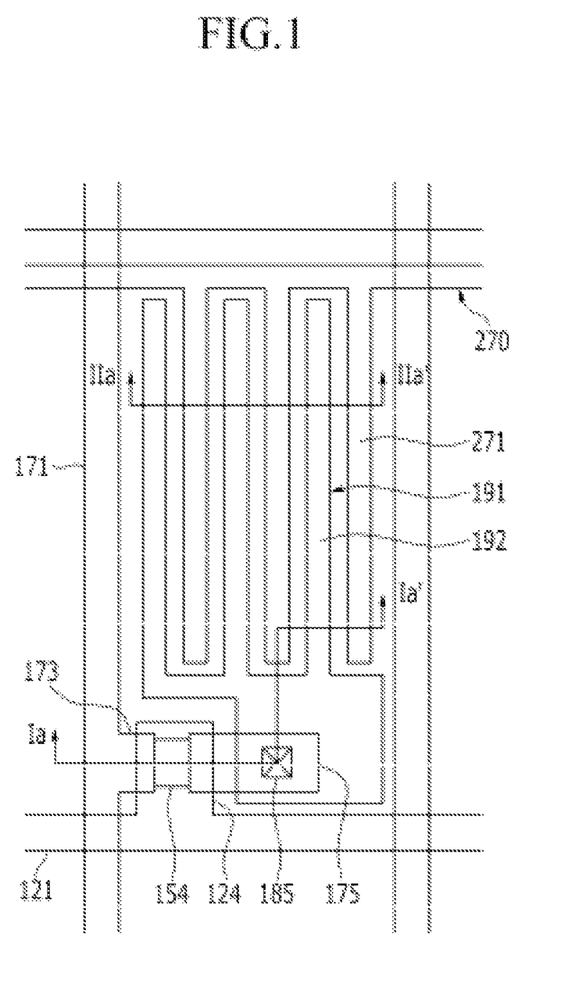
FIG. 1 is a wiring diagram illustrating a display device according to exemplary embodiments of the present invention.

FIG. 1 is a wiring diagram illustrating a display device according to exemplary embodiments of the present invention.

Figure 2:
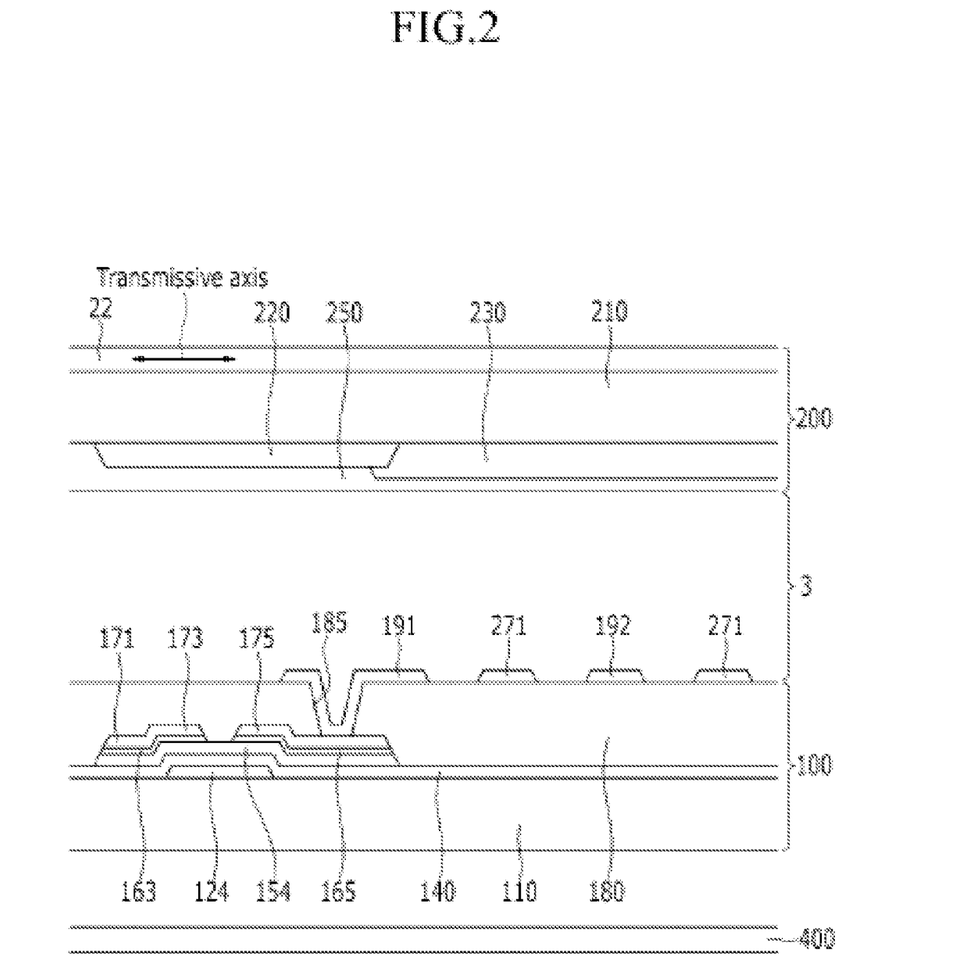
FIG. 2 is a cross-sectional view illustrating the display device of FIG. 1 taken along line I a-I a'.

FIG. 2 is a cross-sectional view illustrating the display device of FIG. 1 taken along line I a-I a'.

Then, the display device will be described in detail with reference to FIGS. 1 and 2.

For example, per FIG. 2, a display device may include a thin film transistor array panel 100 and an upper panel 200 facing each other, and a quantum rod layer 3 interposed between the two display panels 100 and 200.

In FIG. 1, for example, a plurality of gate lines 121 is formed on an insulation substrate 110 made of transparent glass or plastic.

The gate line 121 transfers a gate signal and may extend in a horizontal direction. Each gate line 121 may include a plurality of gate electrodes 124 protruding downward and a wide end portion for connection with another layer or an external driving circuit. A gate driving circuit (not illustrated) generating a gate signal may be installed on a flexible printed circuit film (not illustrated) attached onto the substrate 110, installed directly on the substrate 110, or integrated on the substrate 110 by way of configurations. When the gate driving circuit is integrated on the substrate 110, the gate line 121 is extended to be directly connected to the gate driving circuit.

The gate line 121 may be made of aluminum-based metal such as aluminum (Al) or an aluminum alloy, silver-based metal such as silver (Ag) or a silver alloy, copper-based metal such as copper (Cu) or a copper alloy, molybdenum-based metal such as molybdenum (Mo) or a molybdenum alloy, chromium (Cr), tantalum (Ta), and titanium (Ti). However, the gate lines 121 may have a multilayered structure including two or more conductive layers (not illustrated) having different physical properties. One conductive layer is made of metal having specific resistivity, for example, aluminum-based metal, silver-based metal, and copper-based metal, so as to reduce signal delay or voltage drop. In other examples, other conductive layers are made of other materials, particularly, materials having excellent physical, chemical, electrical contact characteristics with indium tin oxide (ITO) and indium zinc oxide (IZO), for example, molybdenum-based metal, chromium, tantalum, and titanium. A proper example of such a combination may include a chromium lower layer and an aluminum (alloy) upper layer, and an aluminum (alloy) lower layer and a molybdenum (alloy) upper layer. However, the gate line 121 may be made of various metals or conductors in addition to the metals.

A side of the gate line 121 is tilted to the surface of the substrate 110, and a tilt angle thereof may be about 30 degrees to about 80 degrees.

A gate insulating layer 140 made of silicon nitride (SiNx) or silicon oxide (SiOx) is formed on the gate line 121.

A semiconductor 154 made of hydrogenated amorphous silicon (a-Si) or polysilicon is formed on the gate insulating layer 140. The semiconductor 154 mainly extends in a vertical direction.

A plurality of stripe-shaped and island-shaped ohmic contacts 163 and 165 is formed on the semiconductor 154. The ohmic contacts 163 and 165 may be made of a material such as n+ hydrogenated amorphous silicon in which an n-type impurity such as phosphorus is doped at a high concentration, or silicide.

Sides of the semiconductor 154 and the ohmic contacts 163 and 165 are also tilted to the surface of the substrate 110, and tilt angles thereof may be 30 degrees to 80 degrees.

A plurality of data lines 171 and a plurality of drain electrodes 175 are formed on the ohmic contacts 163 and 165 and the gate insulating layer 140.

The data lines 171 transfer a data signal and mainly extend in a vertical direction to cross the gate line 121. Each data line 171 may include a plurality of source electrodes 173 which extend toward the gate electrode 124, and a wide end portion (not illustrated) for connection with another layer or an external driving circuit. A data driving circuit (not illustrated) generating a data signal may be installed on a flexible printed circuit film (not illustrated) attached onto the substrate 110, installed directly on the substrate 110, or integrated on the substrate 110. When the data driving circuit is integrated on the substrate 110, the gate line 121 is extended to be directly connected to the data driving circuit.

The drain electrode 175 is spaced apart from the data line 171 and faces the source electrode 173 based on the gate electrode 124. Each drain electrode 175 may include one wide end portion and a rod-shaped end portion.

In some examples, one gate electrode 124, one source electrode 173, and one drain electrode 175 form one thin film transistor (TFT) together with the semiconductor 154, and a channel of the thin film transistor may be formed in the semiconductor 154 between the source electrode 173 and the drain electrode 175.

When an electric signal is transferred to the source electrode 173 and the gate electrode 124 of the thin film transistor, the thin film transistor is turned on or off according to a scan signal applied to the gate electrode 124 through the gate line 121, and, as a result, an image signal applied to the source electrode 173 through the data line 171 is transferred to or interrupted from the drain electrode 175.

The data line 171 and the drain electrode 175 may be made of refractory metal such as molybdenum, chromium, tantalum, and titanium or an alloy thereof, and may have a multilayered structure including a refractory metal layer (not illustrated) and a low resistive conductive layer (not illustrated). An example of the multilayered structure may include a double layer including a chromium or molybdenum (alloy) lower layer and an aluminum (alloy) upper layer, and a triple layer including a molybdenum (alloy) lower layer, an aluminum (alloy) intermediate layer, and a molybdenum (alloy) upper layer. However, the data line 171 and the drain electrode 175 may be made of various metals or conductors in addition to the metals.

Sides of the data line 171 and the drain electrode 175 may also have tilt angles of about 30 to 80 degrees with respect to the surface of the substrate 110.

The ohmic contacts 163 and 165 exist between the semiconductors 154 therebelow and the data line 171 and the drain electrode 175 thereabove, and decrease contact resistance therebetween.

In some examples, an exposed portion, which is not covered by the data line 171 and the drain electrode 175, in addition to a space between the source electrode 173, and the drain electrode 175, may be formed at the semiconductor 154.

A passivation layer 180 may be positioned on the data line 171, the drain electrode 175, and the exposed semiconductor 154. The passivation layer 180 may be made of an inorganic insulator or an organic insulator, and a surface thereof may be flat. An example of the inorganic insulator may include silicon nitride and silicon oxide. The organic insulator may have photosensitivity, and a dielectric constant thereof may be about 4.0 or less. However, the passivation layer 180 may have a double-layered structure of a lower inorganic layer and an upper organic layer so as not to damage the exposed semiconductor 154 portion while maintaining an excellent insulating characteristic of the organic layer.

A contact hole 185 exposing each drain electrode 175 may be formed in the passivation layer 180.

A pixel electrode 191, a branch electrode 271 of a common electrode 270, and a branch electrode 192 of the pixel electrode 191 may be formed on the passivation layer 180. The pixel electrode 191, the branch electrode 271 of the common electrode 270, and the branch electrode 192 of the pixel electrode 191 are made of a transparent conductive material such as ITO or IZO, or reflective metal such as aluminum, silver, chromium, or an alloy thereof.

In some examples, the pixel electrode 191 may include one or more branch electrodes 192. The pixel electrode 191 is physically and electrically connected to the drain electrode 175 through the contact hole 185, and receives a data voltage from the drain electrode 175.

According to the exemplary embodiments of the present invention, the common electrode 270 may include a plurality of branch electrodes 271. A common voltage Vcom is applied to the common electrode 270. The common electrode 270 may be formed on the same layer as the pixel electrode 191.

For example, the branch electrodes 271 of the common electrode 270 may be disposed between the branch electrodes 192 of the pixel electrode 191, and arranged to be parallel to each other.

In some exemplary embodiments, the common electrode 270 may be formed on the same layer as the pixel electrode 191. In other exemplary embodiments, the common electrode 270 may be formed on a different layer from the pixel electrode 191. Further, the common electrode 270 may be overlapped with a lower layer of the pixel electrode 191, insulated from the lower layer of the pixel electrode, and formed in a plate type structure.

The pixel electrode 191 receives a data voltage from the drain electrode 175, and the common electrode 270 receives a common voltage having a set magnitude. An electric field is generated between the branch electrode 192 of the pixel electrode 191 to which the data voltage is applied and the branch electrode 271 of the common electrode 270 which receives the common voltage. Both the pixel electrode 191 and the common electrode 270 are formed on the thin film transistor array panel 100 and, thus, the generated electric field is a horizontal electric field. The horizontal electric field generated by the two electrodes 191 and 270 rotates a quantum rod of the quantum rod layer 3, and in some exemplary embodiments, the quantum rod rotates in a parallel direction to an electric field direction. However, the quantum rod may rotate in a direction vertical to the electric field direction. The quantum rod layer 3 may comprise a plurality of quantum rods and a plurality of liquid crystal molecules. In this situation, the quantum rod is rotated according to the rotation of the liquid crystal molecule.

As such, polarization of light passing through the quantum rod layer 3 varies according to the determined direction of the quantum rod. The pixel electrode 191 and the common electrode 270 form a capacitor (herein, referred to as a "capacitor") to maintain the applied voltage even after the thin film transistor is turned off.

A backlight unit 400 supplies light to the display device. For example, a light source may supply light of a UV wavelength. The light source may be included in the backlight unit 400.

Next, the upper panel 200 will be described with reference to FIG. 2.

A light blocking member 220 may be formed on an insulation substrate 210 made of transparent glass or the like. The light blocking member 220 may be referred to a black matrix and blocks light leakage. The light blocking member 220 blocks light leakage of the pixel electrode 191. However, the light blocking members 220 may be formed in a region corresponding to the gate line 121 and the data line 171 and a region corresponding to the thin film transistor.

In some examples, a plurality of color filters 230 may be formed on the substrate 210. Most of the color filters 230 exist in an area surrounded by the light blocking member 220 and may be elongated in a vertical direction along the pixel electrode 191. Each color filter 230 may display one of primary colors, such as three primary colors of red, green and blue. According to exemplary embodiments of the present invention, however, the color filters 230 may be omitted.

An overcoat 250 may be formed on the color filter 230 and the light blocking member 220. The overcoat 250 may be made of an (organic) insulator, may prevent the color filter 230 from being exposed, and may provide a flat surface. The overcoat 250 may be omitted.

An upper polarizer 22 has a transmissive axis, and the transmissive axis of the upper polarizer 22 may be parallel to the gate line 121.

The quantum rod layer 3 polarizes light having a wavelength corresponding to a predetermined color. Description for a structure and a function of the quantum rod layer 3 will be described below.

Hereinafter, a quantum rod layer according to the exemplary embodiments of the present invention will be described with reference to FIGS. 3 and 4.

Figure 3:
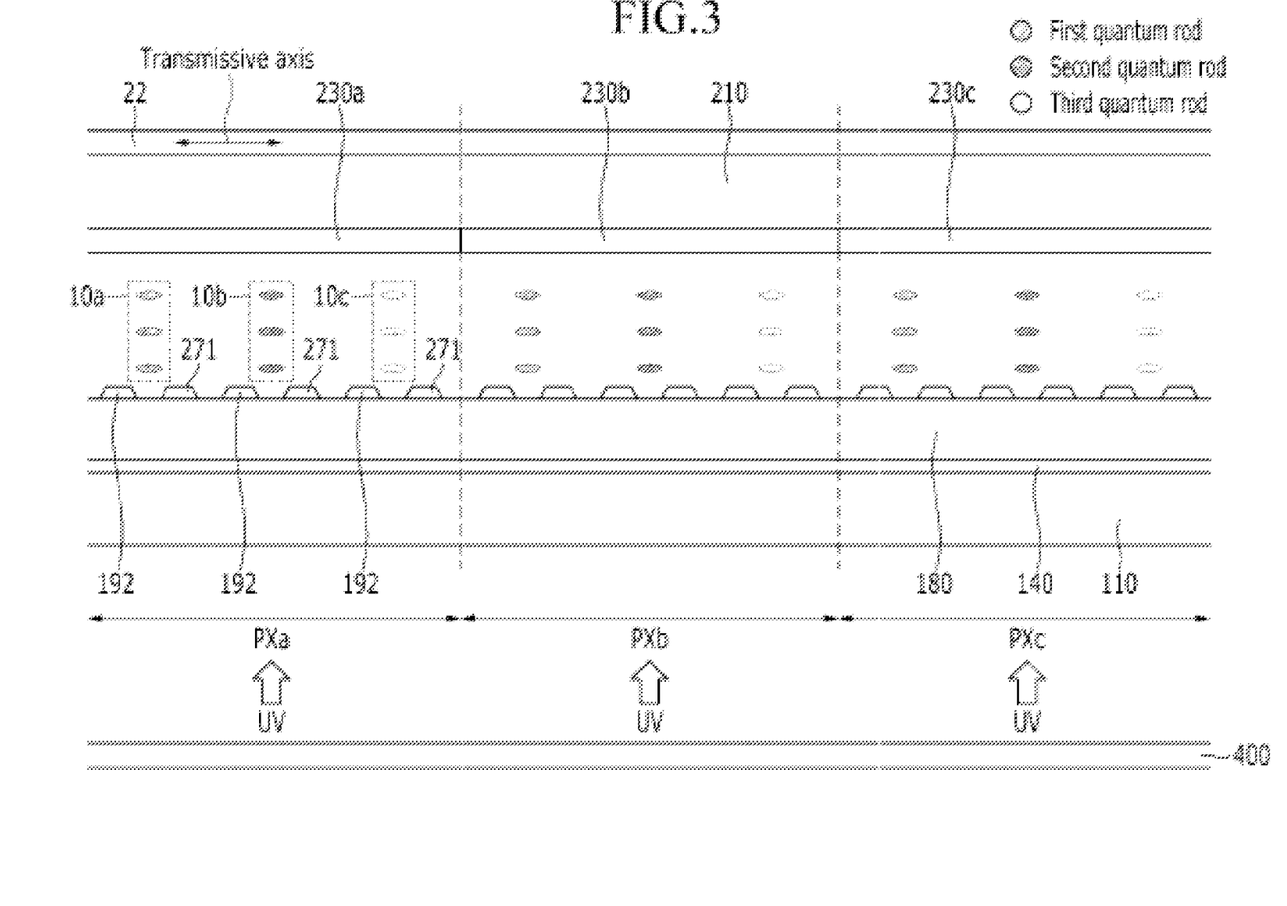
FIG. 3 is a cross-sectional view illustrating the display device according to exemplary embodiments of the present invention including a quantum rod aligned in the same direction as a transmissive axis of an upper polarizer of FIG. 1 taken along line II a-II a'.

FIG. 3 is a cross-sectional view illustrating the display device according to the exemplary embodiments of the present invention including a quantum rod aligned in the same direction as a transmissive axis of an upper polarizer of FIG. 1 taken along line II a-II a'.

Figure 4:
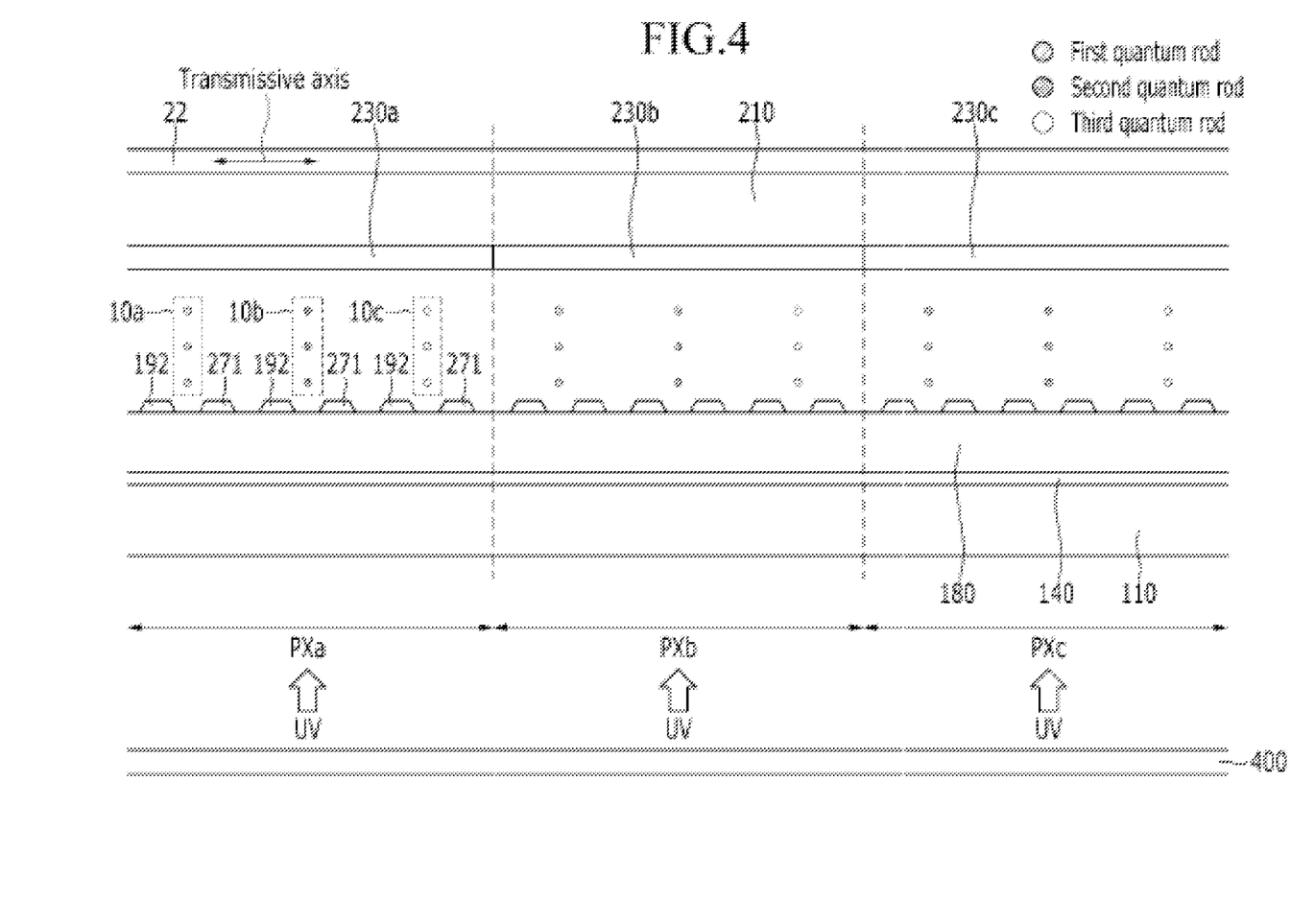
FIG. 4 is a cross-sectional view illustrating the display device according to exemplary embodiments of the present invention including a quantum rod aligned in a vertical direction to a transmissive axis of an upper polarizer of FIG. 1 taken along line II a-II a'.

FIG. 4 is a cross-sectional view illustrating the display device according to the exemplary embodiments of the present invention including a quantum rod aligned in a vertical direction to a transmissive axis of an upper polarizer of FIG. 1 taken along line II a-II a'.

In some examples, the color filters 230 may include one or more color filters 230a, 230b, and 230c displaying different colors.

For illustration purposes, a red filter 230a, a green filter 230b, and a blue filter 230c are described as an example, but exemplary configurations may necessarily not limited thereto. Of course, the present invention may provide color filters having different colors.

The red filter 230a transmits light in a red wavelength band among incident light. The green filter 230b transmits light in a green wavelength band among incident light. The blue filter 230c transmits light in a blue wavelength band among incident light.

Each of the pixels PXa, PXb, and PXc may include one or more of each of the color filters 230a, 230b, and 230c, the upper polarizer 22, the substrate 110, the gate insulating layer 140, and the passivation layer 180.

Hereinafter, for the purpose of illustration, one pixel PXa will be described as an example. However, the present invention may be applied to other embodiments using other pixels PXb and PXc.

In some examples, the quantum rod layer 3 may include a plurality of quantum rods arranged in one direction. The quantum rod may have a diameter of several nm and have a length of tens or hundreds nm when taken along a cross section at the center. A material of the quantum rod may not be limited, thus various materials capable of forming the quantum rod may be used, and may include a material capable of fabricating a quantum dot. According to an exemplary embodiment, some of the quantum rods may be arranged obliquely at an angle of more than 0 degree and 10 degree or less in one direction. However, the present invention may not be limited thereto, and of course, it may be applied to the quantum rods arranged at different angles.

The quantum rod layer 3 may include a plurality of quantum rods. For example, it may be illustrated that a first quantum rod 10a polarizing red by receiving light, a second quantum rod 10b polarizing green by receiving light, and a third quantum rod 10c polarizing blue by receiving light are exemplified, but the present invention may not be limited thereto. The display device may include a quantum rod polarizing different colors. However, hereinafter, as an example, it is described that the first quantum rod polarizes red, the second quantum rod polarizes blue, and the third quantum rod polarizes green.

According to the exemplary embodiments of the present invention, the quantum rod layer 3 corresponding to each of the pixels PXa, PXb, and PXc may include a plurality of quantum rods 10a, 10b, and 10c. The plurality of quantum rods may include a first quantum rod 10a, a second quantum rod 10b, and a third quantum rod 10c.

The first quantum rod 10a receives light generated from the light source to polarize red light. The second quantum rod 10b receives light generated from the light source to polarize green light. The third quantum rod 10c receives light generated from the light source to polarize third light. According to the exemplary embodiments of the present invention, the reason that the quantum rods 10a, 10b, and 10c polarize different light is that a wavelength range of polarized light in an extending direction of the quantum rod varies according to a difference between diameters of central cross sections of the respective quantum rods 10a, 10b, and 10c. Accordingly, quantum rods polarizing various colors may be made by controlling a thickness of each of the quantum rods 10a, 10b, and 10c.

Further, according to another exemplary embodiment of the present invention, a wavelength range of polarizing light may be controlled differently in different constituent materials forming the respective quantum rods 10a, 10b, and 10c.

The quantum rod layer 3 receives and polarizes light generated from the light source 400. In more detail, each of the quantum rods 10a, 10b, and 10c polarizes in a long axial direction of each of the quantum rods 10a, 10b, and 10c. The quantum rod layer 3 configured by the respective quantum rods 10a, 10b, and 10c has the same characteristic. That is, light which is incident to the quantum rod layer 3 is polarized in arrangement directions of the quantum rods 10a, 10b, 10c.

According to exemplary embodiments of the present invention, light passing through the quantum rod layer 3 also passes through the respective filters 230a, 230b, and 230c. For example, when the red filter 230a corresponding to the pixel PXa, light polarized in each of the quantum rods 10a, 10b, and 10c passes through the red filter 230a. Further, since red, green, and blue lights polarized in the respective quantum rods 10a, 10b, 10c pass through the red filter 230a, the light passing through the red filter 230a is white light acquired by combining the red, green, and blue lights. However, since the red filter 230a transmits only light having a red wavelength, the light passing through the red filter 230a is red light. In such a manner, light passing through the green filter 230b corresponding to the pixel PXb is green light, and light passing through the blue filter 230c corresponding to the pixel PXc is blue light.

The light passing through each of the color filters 230a, 230b, and 230c has the same direction as the long axial direction of the quantum rod. Accordingly, when the light passing through each of the color filters 230a, 230b, and 230c has the same direction as the transmissive axis of the upper polarizer 22, the light passing through each of the color filters 230a, 230b, and 230c passes through the upper polarizer 22.

The quantum rod according to the exemplary embodiments of the present invention rotates due to application or interruption of the electric field to the quantum rod layer 3 according to ON/OFF of the thin film transistor. Accordingly, the arrangement direction of the quantum rod is changed according to rotation of the quantum rod.

Accordingly, the arrangement direction of the quantum rod is controlled by controlling the electric field applied to the quantum rod layer 3, and as a result, grays may be expressed by controlling a light quantity passing through the upper polarizer 22.

That is, when the arrangement direction of the quantum rod is the same direction as the transmissive axis of the upper polarizer 22, light passing through each of the color filters 230*a*, 230*b*, and 230*c* maximally passes through the upper polarizer 22. When the arrangement direction of the quantum rod is vertical to the transmissive axis of the upper polarizer 22, light passing through each of the color filters 230*a*, 230*b*, and 230*c* does not pass through the upper polarizer 22.

According to FIG. 3, the quantum rod is aligned in the same direction as the transmissive axis of the upper polarizer 22 and thus light passing through each of the color filters 230*a*, 230*b*, and 230*c* maximally passes through the upper polarizer 22.

According to FIG. 4, the quantum rod is aligned in the vertical direction to the transmissive axis of the upper polarizer 22 and thus light passing through each of the color filters 230*a*, 230*b*, and 230*c* does not pass through the upper polarizer 22.

A display device according to another exemplary embodiment of the present invention will be described with reference to FIGS. 5 and 6.

Figure 5:
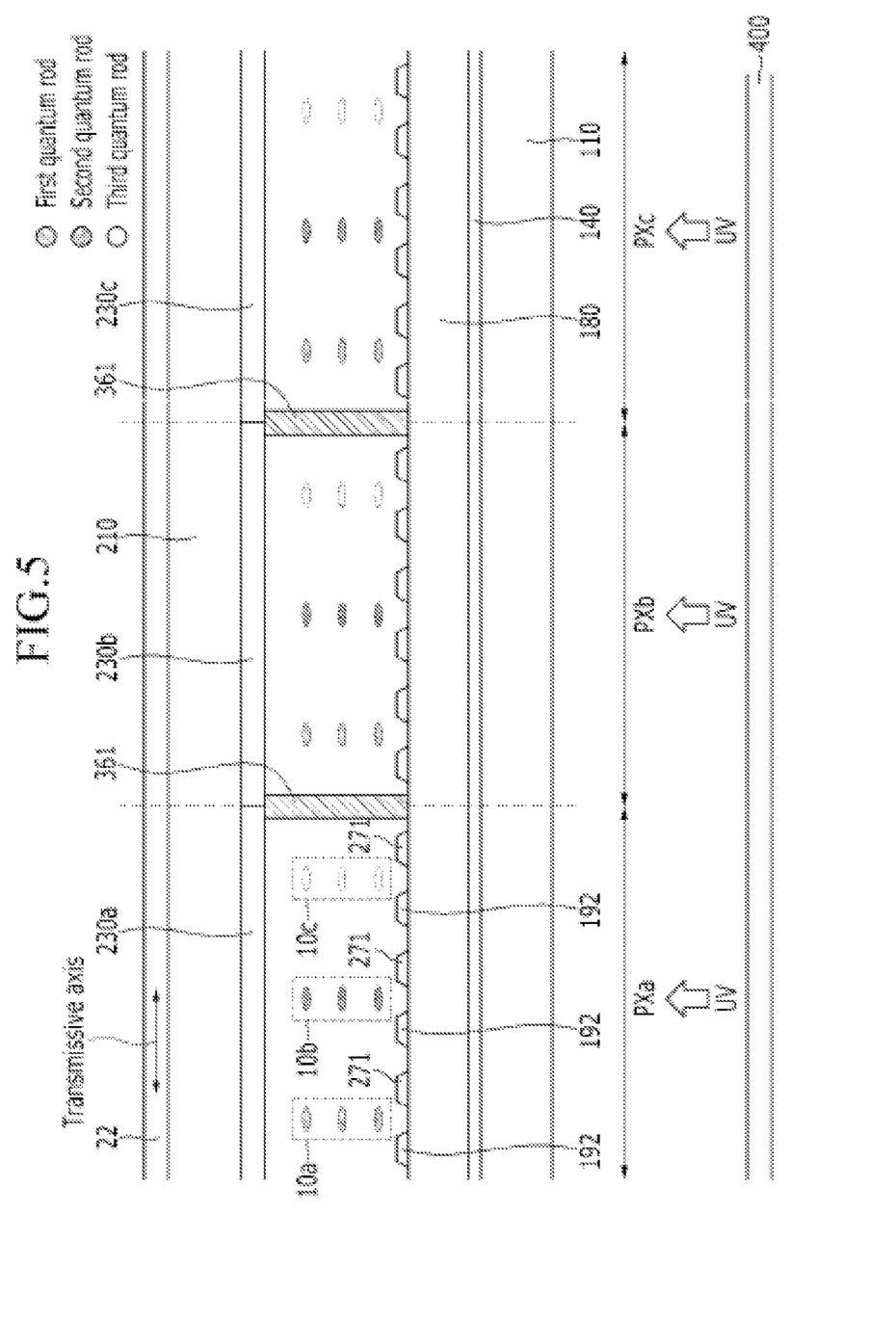
FIG. 5 is a cross-sectional view illustrating a display device according to exemplary embodiments of the present invention including a quantum rod aligned in the same direction as a transmissive axis of an upper polarizer of FIG. 1 taken along line II a-II a'.

FIG. 5 is a cross-sectional view illustrating a display device according to yet another exemplary embodiment of the present invention including a quantum rod aligned in the same direction as a transmissive axis of an upper polarizer of FIG. 1 taken along line II a-II a'.

Figure 6:
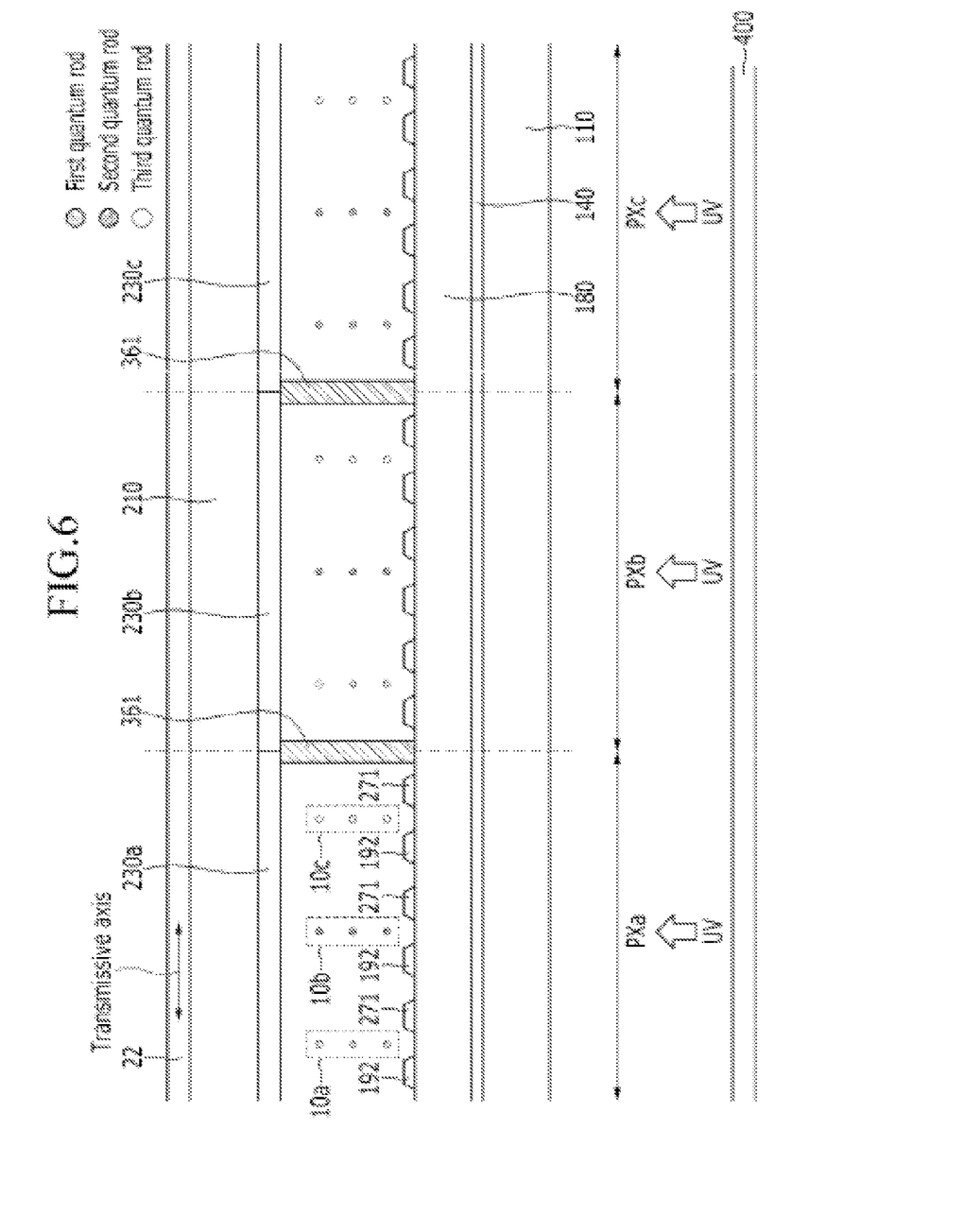
FIG. 6 is a cross-sectional view illustrating a display device according to exemplary embodiments of the present invention including a quantum rod aligned in a vertical direction to a transmissive axis of an upper polarizer of FIG. 1 taken along line II a-II a'.

FIG. 6 is a cross-sectional view illustrating a display device according to yet another exemplary embodiment of the present invention including a quantum rod aligned in a vertical direction to a transmissive axis of an upper polarizer of FIG. 1 taken along line II a-II a'.

In FIGS. 5 and 6, except that the quantum rod layer 3 includes a partition 361, other constituent elements are the same as those of the quantum rod layer 3 described in FIGS. 3 and 4. Accordingly, the same constituent elements as of the previous exemplary embodiment with respect to FIGS. 3 and 4 are indicated by the same reference numerals, and the same description may be omitted to avoid unnecessarily obscuring the present invention.

In some examples, a partition 361 other than the quantum rod layer 3 is included between the thin film transistor array panel 100 and the upper panel 200. The quantum rod layer 3 may be divided by the partition 361. The quantum rod layer 3 corresponding to each of the pixels PXa, PXb, and PXc may be divided by the partition 361. The partition 361 prevents the quantum rod from moving from one pixel to another pixel. Accordingly, even though the quantum rod layer 3 is bent, the quantum rod does not move from a current pixel to other pixels by the partition 361. In the case where a panel is bent like a flexible panel, even though the quantum rod layer 3 is bent, since the quantum rod does not move from a current pixel to other pixels by the partition 361, such a partition 361 may be useful.

In a plan view, a position of the partition 361 may correspond to a position where the light blocking member 220 is formed.

A display device according to another exemplary embodiment of the present invention will be described with reference to FIGS. 7 and 8.

Figure 7:
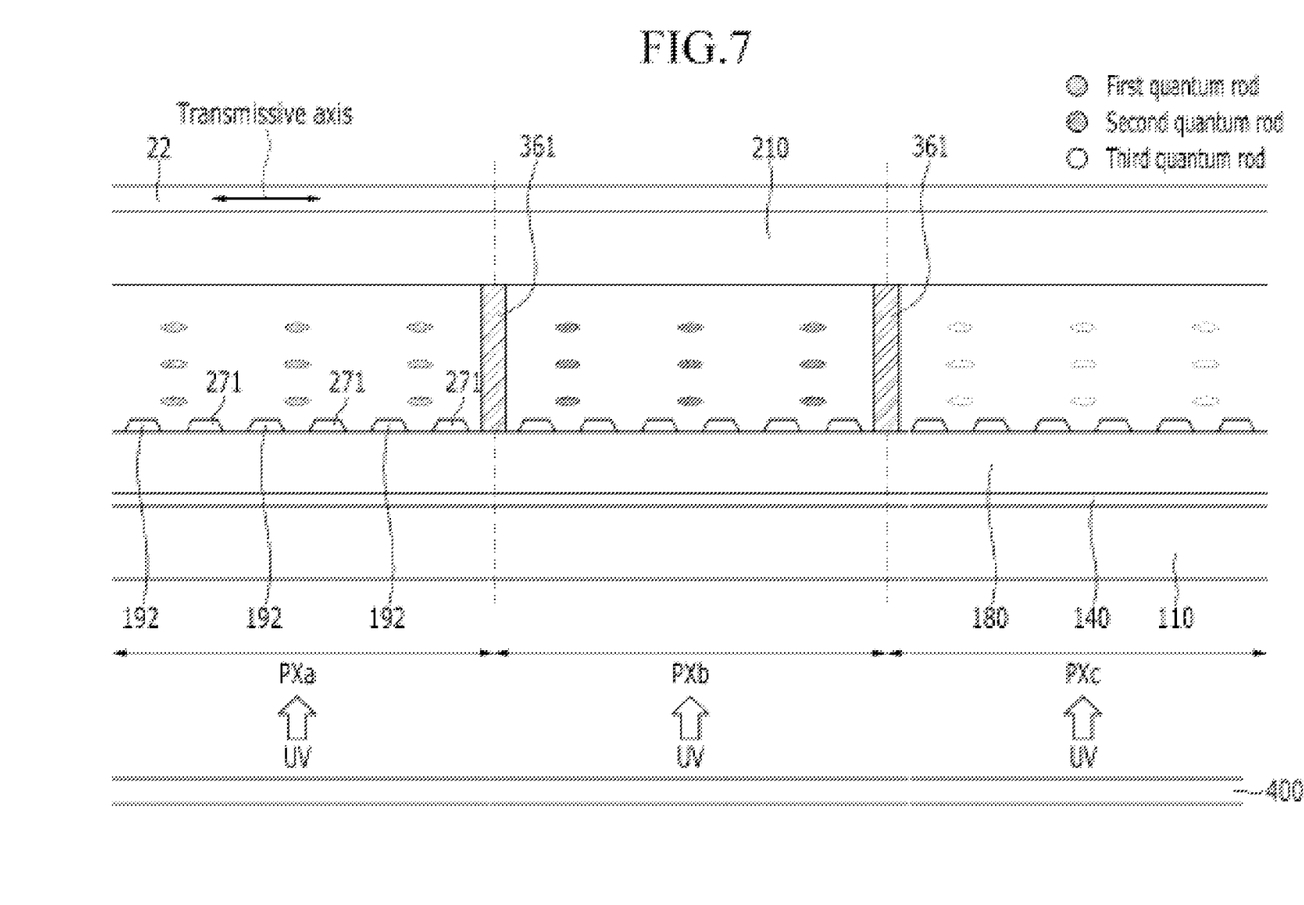
FIG. 7 is a cross-sectional view illustrating a display device according to exemplary embodiments of the present invention including a quantum rod aligned in the same direction as a transmissive axis of an upper polarizer of FIG. 1 taken along line II a-II a'.

FIG. 7 is a cross-sectional view illustrating a display device according to yet another exemplary embodiment of the present invention including a quantum rod aligned in the same direction as a transmissive axis of an upper polarizer of FIG. 1 taken along line II a-II a'.

Figure 8:
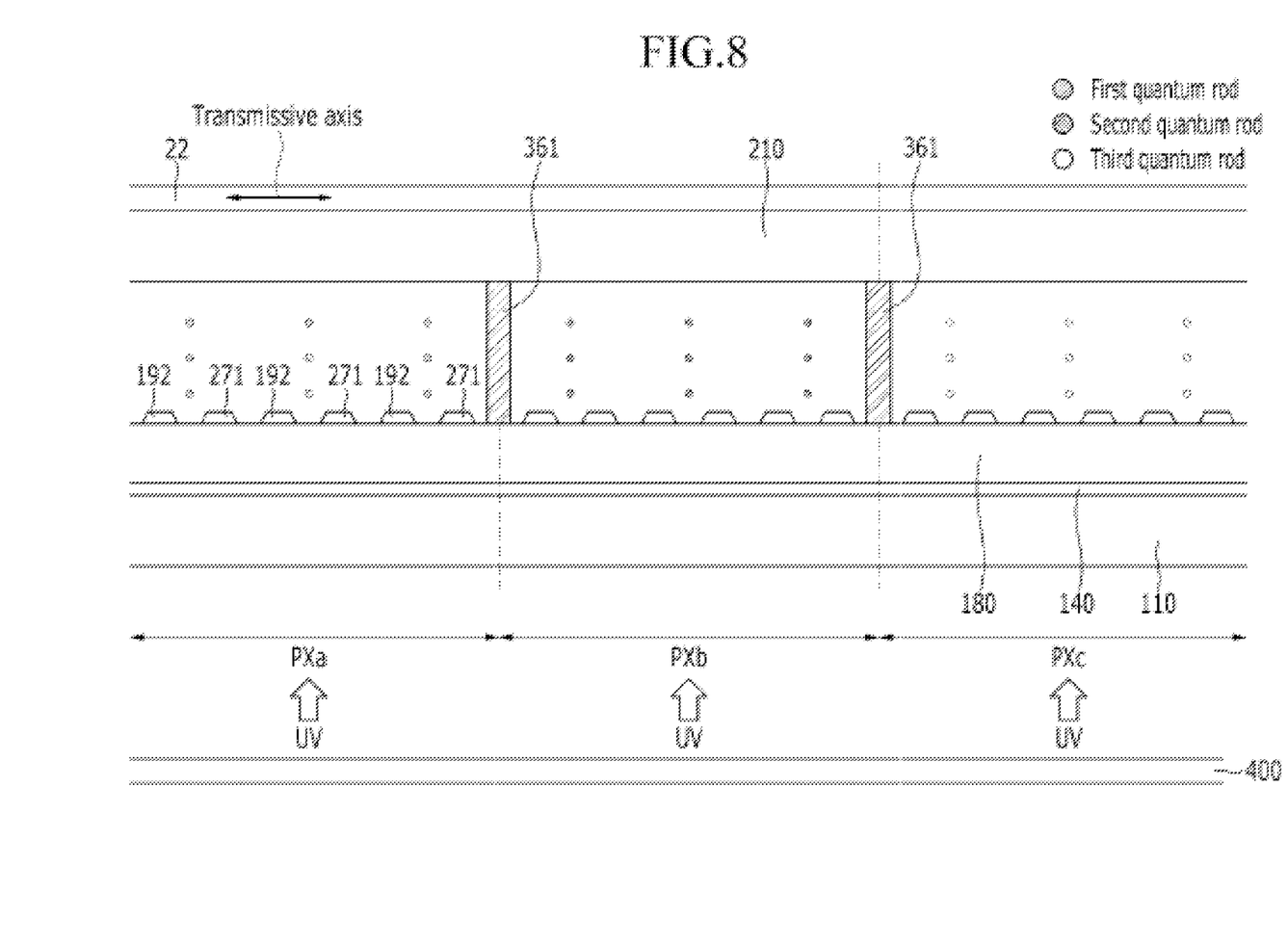
FIG. 8 is a cross-sectional view illustrating a display device according to exemplary embodiments of the present invention including a quantum rod aligned in a vertical direction to a transmissive axis of an upper polarizer of FIG. 1 taken along line II a-II a'.

FIG. 8 is a cross-sectional view illustrating a display device according to yet another exemplary embodiment of the present invention including a quantum rod aligned in a vertical direction to a transmissive axis of an upper polarizer of FIG. 1 taken along line II a-II a'.

In FIGS. 7 and 8, except that the quantum rod layer 3 includes a partition 361, and each of the pixels PXa, PXb, and PXc does not include the color filter 230, a layout of the quantum rods is different, other constituent elements are the same as those of the quantum rod layer 3 described in FIGS. 3 and 4. Accordingly, the same description may be omitted to avoid unnecessarily obscuring the present invention.

In the quantum rod layer 3 according to yet another exemplary embodiment of the present invention, quantum rods having different wavelengths of light polarized and emitted for each of the pixels PXa, PXb, and PXc are disposed. For example, one or more first quantum rods polarizing red in the pixel PXa, one or more second quantum rods polarizing green in the pixel PXb, and one or more third quantum rods polarizing blue in the pixel PXc are disposed. The partition 361 is positioned so that the first to third quantum rods are not mixed. The quantum rod layer 3 corresponding to each of the pixels PXa, PXb, and PXc is divided by the partition 361. The partition 361 prevents the quantum rod from moving from one pixel to other pixels. Accordingly, even though the quantum rod layer 3 is bent, the quantum rod does not move from a current pixel to other pixel by the partition 361. In the case where a panel is bent like a flexible panel, even though the quantum rod layer 3 is bent, since the quantum rod does not move from a current pixel to other pixels by the partition 361, such a partition 361 may be useful.

Since the quantum rod layer 3 corresponding to the pixel PXa includes the first quantum rods polarizing red, the quantum rod layer 3 corresponding to the pixel PXa receives light generated from a light source to polarize red light.

Since the quantum rod layer 3 corresponding to the pixel PXb includes the second quantum rods polarizing green, the quantum rod layer 3 corresponding to the pixel PXb receives light generated from a light source to polarize green light.

Since the quantum rod layer 3 corresponding to the pixel PXc includes the third quantum rods polarizing blue, the quantum rod layer 3 corresponding to the pixel PXc receives light generated from a light source to polarize blue light.

The quantum rod according to the exemplary embodiments of the present invention rotates due to application or interruption of the power to or from the quantum rod layer 3 according to ON/OFF of the TFT. Accordingly, the arrangement direction of the quantum rod is changed according to rotation of the quantum rod.

Therefore, the arrangement direction of the quantum rod is controlled by controlling the power source applied to the quantum rod layer 3, and as a result, a light quantity passing through the upper polarizer 22 may be controlled. That is, the arrangement direction of the quantum rod is controlled by controlling the power source applied to the quantum rod layer 3, and as a result, luminance may be controlled.

That is, the arrangement direction of the quantum rod is the same direction as the transmissive axis of the upper polarizer 22, light passing through the quantum rod layer 3 maximally passes through the upper polarizer 22. When the arrangement direction of the quantum rod is the vertical direction to the transmissive axis of the upper polarizer 22, light passing through the quantum rod layer 3 maximally passes through the upper polarizer 22.

Accordingly, luminance of the display device may be controlled by controlling the light quantity passing through each of the pixels PXa, PXb, and PXc. Further, the arrangement direction of the quantum rods included in each of the pixels PXa, PXb, and PXc may be individually controlled based on a data voltage.

Figure 9:
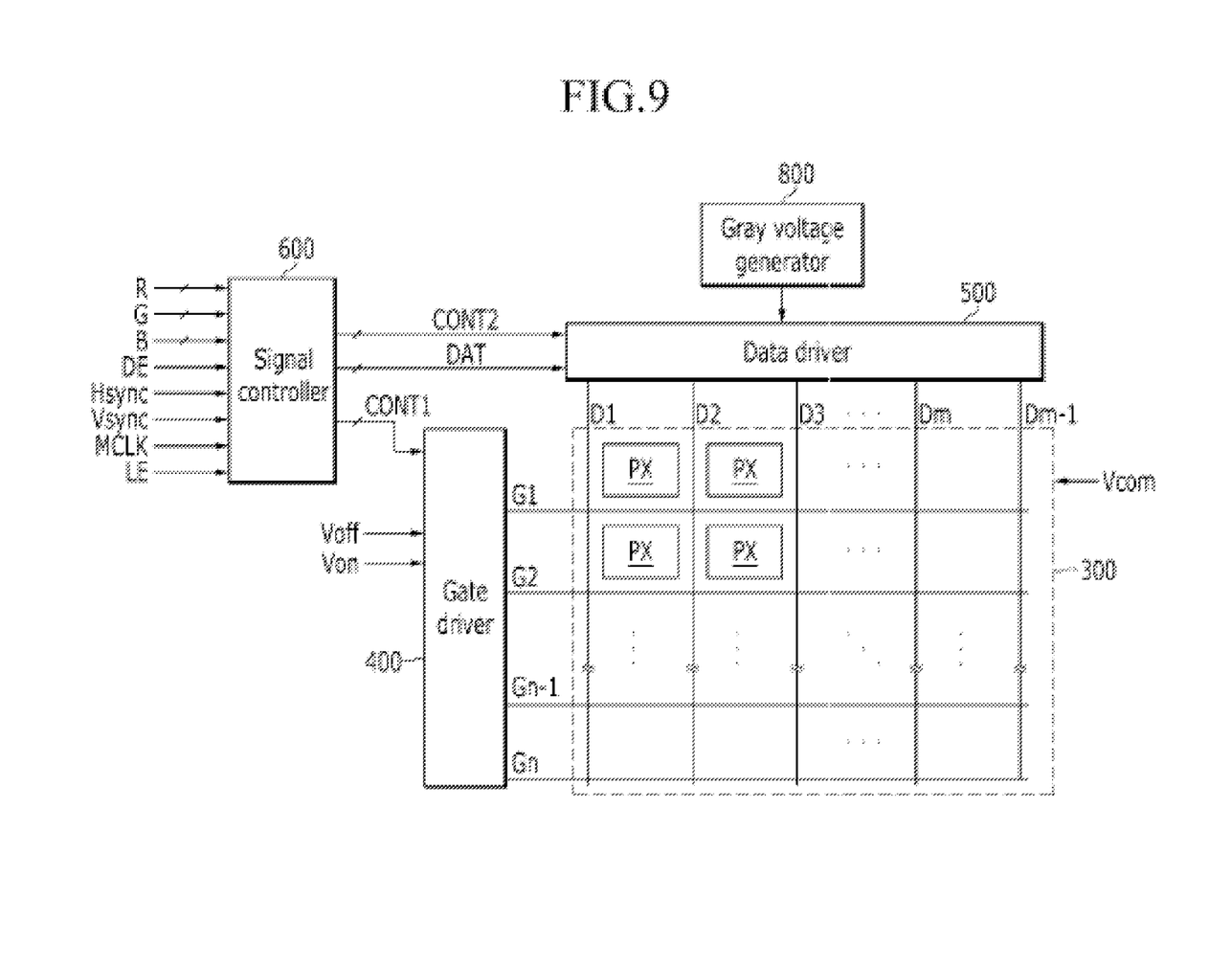
FIG. 9 is a block diagram illustrating the display device according to exemplary embodiments of the present invention.

FIG. 9 is a block diagram illustrating the display device according to the exemplary embodiments of the present invention.

The display device according to the exemplary embodiments of the present invention will be described with reference to FIG. 9.

As illustrated in FIG. 9, for example, the display device may include a panel assembly 300, a gate driver 700 and a data driver 500 connected to the panel assembly 300, a gray voltage generator 800 connected to the data driver 500, and a signal controller 600 controlling the panel assembly 300, the gate driver 700, the data driver 500, and gray voltage generator 800.

The panel assembly 300 may include a plurality of signal lines G1-Gn and D1-Dm, and a plurality of pixels PX connected to the signal lines and arranged substantially in a matrix form when viewed from an equivalent circuit. The panel assembly 300 may include lower and upper panels 100 and 200 facing each other, and a quantum rod layer 3 interposed therebetween.

The signal lines G1-Gn and D1-Dm may include a plurality of gate lines G1-Gn transferring gate signals (referred to as "scanning signals"), and a plurality of data lines D1-Dm transferring data voltages. The gate lines G1-Gn may extend substantially in a row direction and are almost parallel to each other, and the data lines D1-Dm may extend substantially in a column direction and are almost parallel to each other.

Each pixel PX, for example, a pixel PX connected to an i-th gate line Gi (i=1, 2, . . . , n) and a j-th data line Dj (j=1, 2, . . . , m) includes a pixel PX connected to the signal lines Gi and Dj. The pixel includes a switching element Q and a quantum rod supplying light polarized by the quantum rod. The quantum rod includes a pixel electrode 191, a common electrode 271, and a quantum rod layer 3 of which a polarization direction is changed by an electric field generated by the pixel electrode 191 and the common electrode 271.

Meanwhile, in order to implement color display, each pixel PX uniquely displays one of primary colors (spatial division) or alternately displays the primary colors with time (temporal division) so that a desired color is recognized by the spatial and temporal sum of the primary colors. An example of the primary colors may include three primary colors such as red, green, and blue.

For example, each pixel PX may include a color filter 230 expressing one of primary colors in a region of the upper panel 200 corresponding to the pixel electrode 191. That is, three pixels PX expressing red, green, and blue form one dot expressing one color.

One upper polarizer polarizing light is attached to an outer surface of the panel assembly 300.

The gray voltage generator 800 may generate two sets of gray voltages relating to transmittance of the pixel PX. One set of the two sets may have a positive value with respect to a common voltage Vcom, and the other set may have a negative value. The number of gray voltages included in one set of gray voltages generated by the gray voltage generator 800 may be the same as the number of grays displayed by the display device.

The data driver 500 is connected to the data lines D1-Dm of the panel assembly 300, and selects gray voltages from the gray voltage generator 800, and applies the selected gray voltages to the data lines D1-Dm as data voltages.

The gate driver 700 applies a gate signal configured by a combination of a gate-on voltage Von and a gate-off voltage Voff to the gate lines G1-Gn.

The drive devices 500, 600, 700, and 800 may be integrated to the panel assembly 300 together with the signal lines G1-Gn and D1-Dm, and the switching element Q. In some examples, the drive devices 700, 500, 600, and 800 may be directly installed on the panel assembly 300 in at least one IC chip form, installed on a flexible printed circuit film (not illustrated) to be attached to the panel assembly 300 in a tape carrier package (TCP) form, or installed on a separated printed circuit board (not illustrated). Further, the drive devices 500, 600, 700, and 800 may be integrated by a single chip, and in this case, at least one of the drive devices or at least one circuit element configuring the drive devices may be positioned outside of the single chip.

Then, an operation of the display device will be described in detail.

The signal controller 600 receives input image signals R, G and B and an input control signal controlling display of the input image signals R, G and B from an external graphic controller (not illustrated). The input image signals R, G and B store luminance information of each pixel PX, and luminance has the predetermined number of grays, for example, 1024 ($=2^{10}$), 256 ($=2^{8}$), or 64 ($=2^{6}$). For example, input control signal includes a vertical synchronization signal Vsync, a horizontal synchronizing signal Hsync, a main clock MCLK, a data enable signal DE, and the like.

The signal controller 600 generates and properly processes input image signals R, G, and B and an output image signal DAT based on an input control signal, and generates a gate control signal CONT1, a data control signal CONT2, and a illumination control signal CONT3. Next, the signal controller 600 transmits the gate control signal CONT1 to the gate driver 700, and transmits the data control signal CONT2 and the processed output image signal DAT to the data driver 500.

The gate control signal CONT1 includes a scanning start signal STV instructing scanning start and at least one clock signal controlling an output period of the gate-on voltage Von. The gate control signal CONT1 may further include an output enable signal OE limiting a duration time of the gate-on voltage Von.

The data control signal CONT2 includes a horizontal synchronization start signal STH notifying transmission start of the output image signal DAT for one set of pixels, a load signal LOAD instructing a data voltage to be applied to the panel assembly 300, and a data clock signal HCLK. The data control signal CONT2 may further include an inversion signal RVS reverting a voltage polarity of the data voltage for the common voltage Vcom (hereinafter, referred to as a "polarity of the data signal" by shortening a "voltage polarity of the data signal for the common voltage").

According to the data control signal CONT2 from the signal controller 600, the data driver 500 receives the digital output image signal DAT for one set of pixels PX and selects a gray voltage corresponding to each digital output image signal DAT to convert the digital output image signal DAT into an analog data voltage and then apply the converted analog data voltage to the corresponding data lines D1-Dm.

The gate driver 700 applies a gate-on voltage Von to the gate lines G1-Gn according to the gate control signal CONT1 from the signal controller 600 to turn on the switching element Q connected to the gate lines G1-Gn. Then, the data voltages applied to the data lines D1-Dm are applied to the corresponding pixels PX through the turned-on switching elements Q.

A difference between the data voltage applied to the pixel PX and the common voltage Vcom is represented as a charging voltage of a capacitor Clc, that is, a pixel voltage.

The change in the polarization is represented as a change in transmittance of light by a polarizer attached to the panel assembly 300, and as a result, the pixel PX displays luminance represented by a gray of the image signal DAT.

The process is repeated by setting 1 horizontal period [referred to as "1H", and being the same as one period of a horizontal synchronizing signal Hsync and a data enable signal DE] by a unit, and as a result, the gate-on voltages Von are sequentially applied to all the gate lines G1-Gn and the data voltages are applied to all the pixels PX to display images for one frame.

When one frame ends, the next frame starts, and a state of the inversion signal RVS applied to the data driver 500 is controlled so that the polarity of the data voltage applied to each pixel PX is opposite to the polarity in the previous frame ("frame inversion"). In this case, even in one frame, a polarity of the data voltage flowing through one data line is periodically changed according to a characteristic of the inversion signal RVS (example: row inversion, dot inversion), or the polarities of the data voltages applied to one pixel row may be different from each other (example: column inversion, dot inversion).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a light source;
a thin film transistor array panel comprising a pixel electrode and a common electrode;
an upper panel;
a quantum rod layer positioned between the thin film transistor array panel and the upper panel; and
a polarizer attached outside of the upper panel, wherein the quantum rod layer comprises quantum rods, and an arrangement direction of the quantum rods is controlled by an electric field generated by the pixel electrode and the common electrode in order to control a light quantity passing through the upper polarizer by changing an angle between the arrangement direction of the quantum rods and a transmissive axis of the polarizer,
wherein the quantum rods comprise a first quantum rod, a second quantum rod, and a third quantum rod each having different thickness from each other,
wherein each of the first, second, and third quantum rods has a long axis longer than an axis perpendicular to the long axis and is arranged along first, second, and third long axes, respectively, when the electric field is not applied,
wherein light is polarized according to the controlled arrangement direction,
wherein the first quantum rod is configured to polarize only light of a first wavelength range, in response to the applied electric field by rotating around a long axial direction of the first quantum rods,
wherein the second quantum rod is configured to polarize only light of a second wavelength range different from the first wavelength range, in response to the applied electric field by rotating around a long axial direction of the second quantum rods, and
wherein the polarizer is configured to control the transmission degree of the polarized light from the quantum rods according to the arrangement direction of the quantum rods.

2. The display device of claim 1, wherein the first quantum rod is configured to polarize red light, the second quantum rod is configured to polarize green light, and the third quantum rod is configured to polarize blue light.

3. The display device of claim 2, wherein the first quantum rod, the second quantum rod, and the third quantum rod are formed of different materials from each other.

4. The display device of claim 2, further comprising:
a color filter configured to receive the red light polarized by the first quantum rod, the green light polarized by the second quantum rod, and the blue light polarized by the third quantum rod, and to pass through only a wavelength of a predetermined color.

5. The display device of claim 4, wherein:
the quantum rod layer comprises a partition; and
the partition dividing a quantum rod layer corresponding to each pixel, and preventing the quantum rod from moving from a quantum rod layer corresponding to one pixel to a quantum rod layer corresponding to another pixel.

6. The display device of claim 1, wherein:
the quantum rod layer is divided into a region corresponding to each pixel; and
one region of the quantum rod layer of the region corresponding to each pixel comprises one of the first quantum rod, the second quantum rod, and the third quantum rod.

7. The display device of claim 6, wherein:
the plurality of pixels comprises the quantum rod layer comprising a first region, a second region, and a third region corresponding to each pixel; and
the first region comprises the first quantum rod, the second region includes the second quantum rod, and the third region comprises the third quantum rod.

8. The display device of claim 7, wherein the first quantum rod is configured to polarize red light, the second quantum rod polarizes green light, and the third quantum rod is configured to polarize blue light.

9. The display device of claim 8, wherein the first quantum rod, the second quantum rod, and the third quantum rod are formed different materials from each other.

10. The display device of claim 8, wherein:
the quantum rod layer comprises a partition; and
the partition is configured to divide the first region, the second region, and the third region, and to prevent the quantum rod of any one of the first region, the second region, and the third region from moving to other regions.

11. The display device of claim 10, wherein a color filter is not included.

12. The display device of claim 10, wherein the quantum rods of the first region, the second region, and the third region vary an arrangement direction for each region.

13. The display device of claim 1, wherein the quantum rod layer further comprises a plurality of liquid crystal molecules.

14. A method of manufacturing a display device, comprising:
    disposing a quantum rod layer between panels of a display device, the quantum rod layer comprising quantum rods, the quantum rods comprising a first quantum rod, a second quantum rod, and a third quantum rod having different thicknesses from each other;
    generating an electric field to control an arrangement direction of the quantum rods, wherein light is polarized according to the controlled arrangement direction, wherein each of the first, second, and third quantum rods has a long axis longer than an axis perpendicular to the long axis and is arranged along first, second, and third axes, respectively, when the electric field is not applied, wherein the first quantum rod polarizes only light of a first wavelength range, in response to the applied electric field by rotating around a long axial direction of the first quantum rods, wherein the second quantum rod polarizes only light of a second wavelength range different from the first wavelength range, in response to the applied electric field by rotating around a long axial direction of the second quantum rods; and
    disposing a polarizer to control the transmission degree of the polarized light from the quantum rods according to the arrangement direction of the quantum rods.

15. A display device, comprising:
    a controller:
    a thin film transistor array panel comprising a pixel electrode and a common electrode;
    a quantum rod layer comprising quantum rods; and
    a polarizer configured to control the transmission degree of polarized light from the quantum rods according to the arrangement direction of the quantum rods;
    wherein the controller is configured to control an arrangement direction of the quantum rods by generating an electric field by the pixel electrode and the common electrode in order to control a light quantity passing through the upper polarizer by changing a transmission degree between the arrangement direction of the quantum rods and a transmissive axis of the polarizer,
    wherein the quantum rods comprises a first quantum rod, a second quantum rod, and a third quantum rod each having different thickness from each other,
    wherein each of the first, second, and third quantum rods has a long axis longer than an axis perpendicular to the long axis and is arranged along first, second, and third long axes, respectively, when the electric field is not applied,
    wherein the first quantum rod is configured to polarize only light of a first wavelength range, in response to the applied electric field by rotating around a long axial direction of the first quantum rods, and
    wherein the second quantum rod is configured to polarize only light of a second wavelength range different from the first wavelength range, in response to the applied electric field by rotating around a long axial direction of the second quantum rods.

* * * * *